United States Patent [19]

Rose

[11] Patent Number: 5,206,587
[45] Date of Patent: Apr. 27, 1993

[54] INDUCTIVE DISPLACEMENT TRANSDUCER HAVING TELESCOPING PROBE ASSEMBLY

[76] Inventor: Mitchell Rose, 3718 Silsby Rd., University Heights, Ohio 44118

[21] Appl. No.: 781,847

[22] Filed: Oct. 23, 1991

Related U.S. Application Data

[63] Continuation-in-part of Ser. No. 502,847, Mar. 30, 1990, Pat. No. 5,111,139.

[51] Int. Cl.⁵ .......................... G01B 7/14; H01F 21/06
[52] U.S. Cl. ........................... 324/207.16; 324/207.22; 336/133
[58] Field of Search ................... 324/207.15, 207.16, 324/207.14, 207.22, 207.25, 207.24, 233, 234, 236; 336/84 R, 84 C, 84 M, 136, 45, 233, 210, 234, 133, 132; 331/65, 67

[56] References Cited

U.S. PATENT DOCUMENTS

| | | | |
|---|---|---|---|
| 3,654,549 | 4/1972 | Maurer et al. | 324/207.16 |
| 3,891,918 | 6/1975 | Ellis | 324/207.16 |
| 3,991,393 | 11/1976 | Becker et al. | 336/30 |
| 4,203,085 | 5/1980 | Elässer et al. | 336/210 |
| 4,284,961 | 8/1981 | Landau | 324/207.24 X |
| 4,406,999 | 9/1983 | Ward | 324/207.16 X |
| 4,502,006 | 2/1985 | Goodwin et al. | 324/207.16 |
| 4,627,280 | 12/1986 | Hayashi et al. | 73/290 R |
| 4,667,158 | 5/1987 | Redlich | 324/207 |
| 4,950,985 | 8/1990 | Voss et al. | 324/207.16 |

Primary Examiner—Gerard R. Strecker
Assistant Examiner—Warren S. Edmonds
Attorney, Agent, or Firm—Calfee, Halter & Griswold

[57] ABSTRACT

An inductive displacement transducer is provided having a two-piece probe assembly capable of being displaced within the hollow interior portion of a coil. The probe assembly comprises a cylindrical rod disposed within a tube. The rod and the tube are each movable with respect to each other and with respect to the coil. The coil is uniformly wound and is connected electrically in parallel with a stable-frequency current-based oscillator which transmits an AC voltage oscillating signal corresponding to the inductance of the coil. A demodulating circuit, which is capable of converting the AC voltage oscillating signal to a DC voltage level, is connected in parallel with the oscillator. In the preferred embodiment, the coil is covered with a shield which is slit along its length. In operation, the two-piece probe assembly is displaced within a hollow portion of the coil such that a change in inductance results when the rod is displaced relative to the tube. A corresponding change in the AC voltage amplitude of the oscillator output is communicated to the demodulating circuit which generates a change in DC voltage level corresponding to the change in the oscillating signal.

10 Claims, 2 Drawing Sheets

INDUCTIVE DISPLACEMENT TRANSDUCER HAVING TELESCOPING PROBE ASSEMBLY

This application is a continuation-in-part of application Ser. No. 07/502,847 filed Mar. 30, 1990, now U.S. Pat. No. 5,111,139. The invention relates to electrical apparatuses for converting the relative motion of an object into an electrical signal and more particularly to an improved inductive displacement transducer.

BACKGROUND OF THE INVENTION

In the field, it is often necessary to convert a position of an object relative to an origin into an electrical signal. This output signal, which can be analog or digital, is often then fed into other electrical devices. In process monitoring systems, for example, the signal can be input into an electrical indicator which outputs a display of the required data. Such data may include liquid pressure, linear position, tension, or any other like measurement. In process control systems, for example, the electrical signal can be used as feedback and input into the controller which responds, based on the nature of the signal, to control the position of the object relative to an origin.

Applications exist for inductive based measurements of linear displacement of a probe. In a device such as that disclosed by U.S. Pat. No. 4,667,158 to Redlich, the linear displacement of a metallic cylindrical core within a helical coil of wire causes corresponding changes in the amplitude of the voltage signal imposed across the coil. This voltage signal is then demodulated by a half-wave rectifier including a diode, a resistor and a low-pass filter. A reference signal is demodulated by a second identical half-wave rectifier. The demodulated reference signal and the demodulated coil voltage signal are fed into the inverting and non-inverting inputs of a differential amplifier having an output which drives an electrical indicating instrument.

As disclosed by the Redlich patent, a metal jacket may be positioned around the coil of a displacement transducer to confine magnetic flux generated by the coil, as a result of current being transmitted therethrough, and to shield the transducer from stray fields. Redlich indicates that, when using the shield, it is desirable to increase sensitivity by partially filling the space between the coil and the shield with bonded ferrite powder.

It has been determined through experimentation that use of a cylindrical shield, such as that disclosed by Redlich, that is substantially continuous throughout its length, tends to significantly degrade sensitivity. Thus, adequate sensitivity in measurement cannot be achieved with the Redlich arrangement unless the space between the coil and the shield is filled with bonded ferrite powder or the like. In practice, filling the space defined by the shield and the coil is disadvantageous, however, since it leads to increases in cost of materials and requires the use of additional steps during the process of manufacturing the transducer. Thus, there is a need for a shield arrangement in which acceptable levels of measurement sensitivity are maximized without significantly increasing manufacturing costs and procedure.

In a similar device, such as that shown in U.S. Pat. No. 3,991,393 to Becker, Jr., the movement of a shielded core within a coil alters the inductance of the coil. The shield is not moveable with respect to the core but is instead fixedly attached to the core. Means are provided for delivering a signal responsive to the position of the shield and the core relative to the electric coil.

SUMMARY OF THE INVENTION

According to the present invention, an inductive displacement transducer is provided having a two-piece probe assembly capable of being disposed within the hollow interior portion of an inductive coil. The two-piece probe assembly comprises a cylindrical rod disposed within a tube. The rod and the tube are moveable with respect to each other and with respect to the coil. The coil is connected electrically in parallel with a stable frequency current-based oscillating circuit which transmits an AC voltage oscillating signal relating to the inductance of the coil.

Additionally, a demodulating circuit, which is capable of converting the AC voltage oscillating signal to a DC voltage level, is connected in parallel with the oscillating circuit. In the preferred embodiment, the coil, which has a longitudinal axis, is uniformly wound and covered with a shield. The shield is adapted to protect the coil and the probe assembly from external elements, and may be formed from a thermoplastic material. In another embodiment, the shield is a metal jacket having a slit disposed therein. The slit is coextensive with the longitudinal axis of the coil and preferably extends along the entire length of the shield.

During operation, displacement of the rod relative to the tube results in changes in the inductance of the coil. A change in inductance results in a corresponding change in the AC voltage amplitude of the signal output of the oscillating circuit, which in turn is communicated to the demodulating circuit. The demodulating circuit outputs a DC voltage level corresponding to the linear change in the voltage amplitude of the oscillating circuit output.

In the preferred embodiment of the invention, the probe assembly comprises a ferromagnetic rod (e.g., steel) disposed within a tube constructed from a material of high electrical conductivity and low magnetic permeability (e.g., copper or aluminum). The ferromagnetic rod is adapted to slide within the tube. Such a construction permits movement of the rod and the tube relative to each other and relative to the coil to obtain displacement measurements under those circumstances in which the displacement of two surfaces moving relative to one another is desired.

One advantage of the invention is that it presents a particularly economical way to achieve accurate measurements of displacement. In particular, a transducer which maximizes sensitivity while minimizing production costs is provided. For example, by adding a shield with a slit disposed therein, effects of temperature and circuit drift are significantly reduced while the coil is still protected from stray fields. Another advantage of the transducer is that is promotes simplicity of design on both structural and procedural levels while maintaining highly desirable levels of measurement capability. It is particularly significant that the transducer eliminates many of the inefficiencies and/or difficulties encountered when making inductive based measurements requiring displacement of multiple surfaces moving relative to each other. More specifically, measurements of two surfaces moving relative to each other can be made with a two-piece probe assembly having components which are readily positioned and moved relative to each other and to the coil.

These and other features, advantages and objects of the present invention will be further understood and appreciated by those skilled in the art by reference to the following written specification, claims and appended drawings.

DETAILED DESCRIPTION OF THE PREFERRED EMBODIMENT

It is understood that the invention described below may assume various alternative orientations except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics related to the embodiments disclosed herein are not to be considered as limiting, unless the claims by their language expressly state otherwise.

Figure 1:
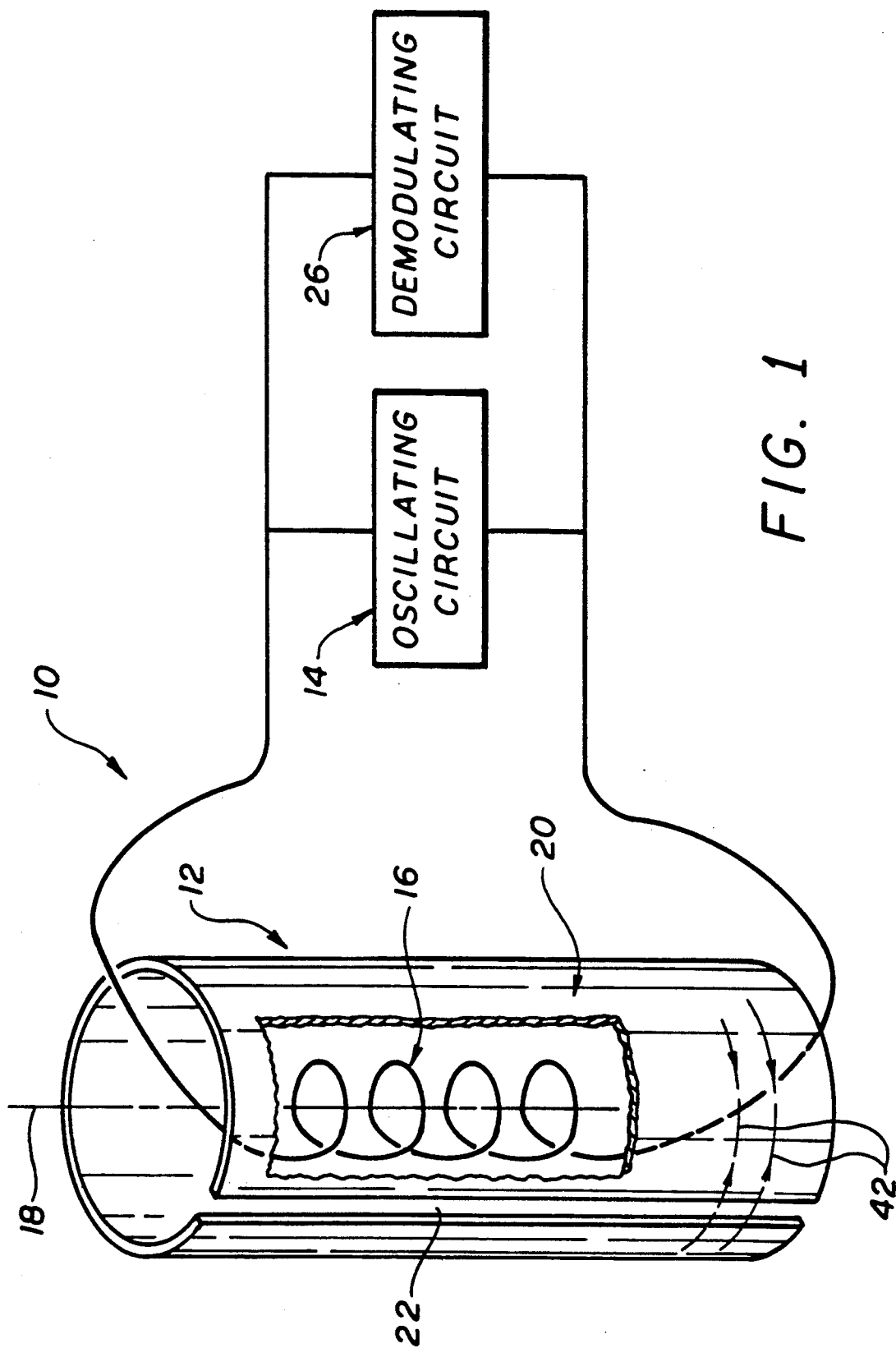
FIG. 1 is a partially diagrammatic, partially perspective view of an inductive displacement transducer, not including the probe assembly, embodying the present invention and including a shield having a partially broken away portion.

Referring to FIG. 1, an inductive displacement transducer embodying the present invention is designated generally by the numeral 10. The transducer 10 includes a coil arrangement 12 and an oscillating circuit 14. In one example, the coil arrangement includes a coil 16, which is cylindrical and uniformly wound. The coil 16 is disposed along a longitudinal axis 18, and in order to generate a magnetic field, the coil is made of a conductive material through which current can readily be transmitted. Finally, the coil may, in one example, have a length ranging from 1 inch to 25 inches and a diameter ranging from 0.1 inch to 0.5 inch. In the preferred embodiment of the present invention, the coil 16 is covered by a shield 20 which is adapted to protect the coil from the environment, and may be formed from an electrically nonconductive material such as plastic. If constructed from a conductive material such as metal, however, the shield is provided with a slit 22, the significance of which is discussed in further detail below.

The oscillating circuit 14, which is connected electrically in parallel with the coil arrangement 12, includes conventional componentry and is designed to produce a sine wave having a frequency and a current amplitude, both of which are constant. The voltage amplitude of the sine wave, however, varies as a function of the change in the inductance of the coil. A demodulating circuit 26, which is also constructed of known componentry is connected electrically in parallel with the oscillator circuit 14. It has been determined that desirable demodulation can be achieved by using the demodulator circuit of U.S. Pat. No. 4,667,158 to Redlich, which is incorporated by reference herein. The demodulating circuit 16 is designed to output a DC voltage that is linearly related to the voltage amplitude of the sine wave output of the oscillating circuit 14.

Figure 2:
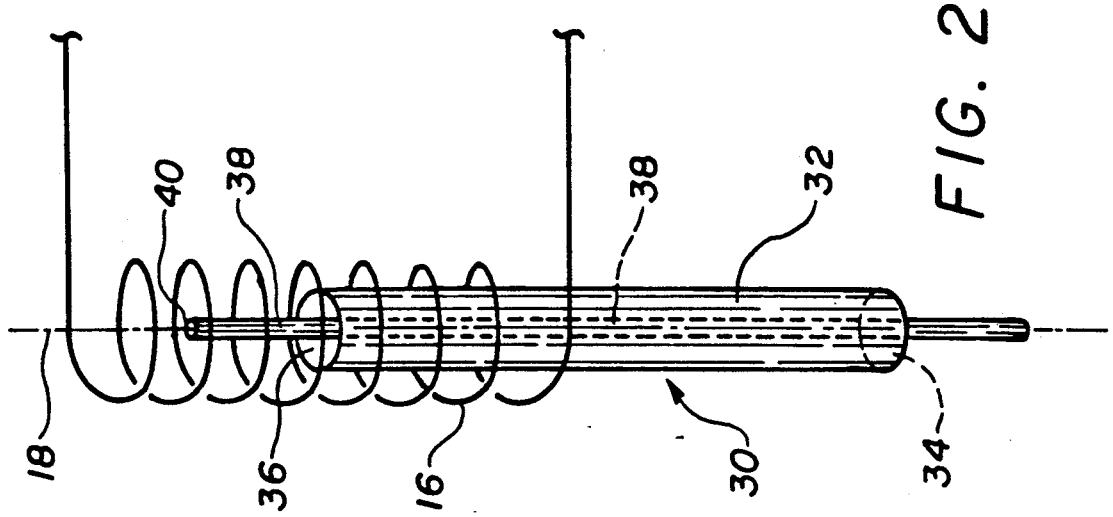
FIG. 2 is a perspective view of the probe assembly for the transducer shown in FIG. 1.

Referring to FIG. 2, a probe assembly adapted to measure the displacement of two surfaces moving relative to one another is designated generally by the numeral 30. Probe assembly 30 includes a hollow tube 32 having openings 34, 36 and a rod member 38 having an end 40. In one aspect of the invention, the rod member 38 has a length which is greater than that of hollow tube 32 such that a substantial portion of the rod member 38 can be disposed within the hollow portion of tube 32, and a lower end of rod member 38 can be grasped for movement of the same along longitudinal axis 18.

In the preferred embodiment, the rod member 38 is constructed from a ferromagnetic material, such as steel, and the tube 32 is constructed from a material of high electrical conductivity and low magnetic permeability, such as copper or aluminum.

In the preferred form of operation, in which linear displacement of the rod member within the tube is to be measured, the above-described sine wave is produced using the oscillating circuit 14 (FIG. 1). As the axial position of the rod member is altered with respect to the tube, the load on oscillating circuit 14 is correspondingly altered. To maintain constant current amplitude, the oscillating circuit 14 adjusts its voltage amplitude. Since the AC amplitude of the output of the oscillating circuit 14 is linear with the inductance of coil 16, and the DC voltage output of the demodulating circuit 26 is linear with the AC voltage amplitude of the output of the oscillating circuit 14, the output of the demodulating circuit 26 responds linearly to the positional adjustment of the rod member within the tube along the longitudinal axis 18 of coil 16.

As mentioned above, the shield 20 is advantageously provided with a slit 22. In particular, applicant has found through experimentation that use of a solid walled shield 20 will lead to degradation in sensitivity of measurements achieved. Providing slit 22 significantly enhances measurement sensitivity by eliminating the path 42 of eddy currents which act to reduce the inductance of the coil. As will be appreciated by those skilled in the art, the addition of slit 22 is an efficient and simple way to enhance sensitivity.

Figure 3:
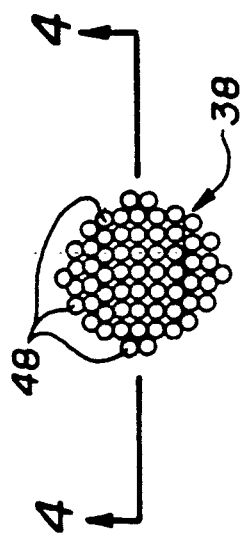
FIG. 3 is an end view of a rod member for the probe assembly constructed from a plurality of wires.
Figure 4:
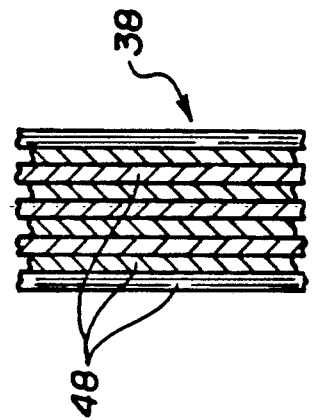
FIG. 4 is a longitudinal cross-sectional view of the rod member of FIG. 3 taken along the plane 4—4.

Referring to FIGS. 3 and 4, the rod member 38 of probe assembly 30 is shown in an embodiment which is capable of enhancing the sensitivity of transducer 10. The rod member of FIGS. 3 and 4 is constructed from a plurality of wires 48 which are conventionally bound together. Applicant has found that steel cable having 49 strands, typically found in hardware stores, can be employed to achieve desirable measurements.

Referring again to the rod member 38 of FIGS. 3 and 4, it should be appreciated that the sensitivity of measurement is dramatically increased as the amount of wires employed to construct a given rod member is increased. More specifically, the sensitivity of the transducer will be increased when it is used in conjunction with a rod member composed of more than two metal wires 48, such as the multiple wire rod member shown in FIGS. 3 and 4. It has been determined that when the rod member is constructed from a number, n, of wires 48, each of which is substantially uniform, the gain in sensitivity of transducer 10, i.e., S, is proportional to the square root of n.

To more fully understand the above relationship, consider the following example: a cylindrically shaped rod member having a given total circumference is constructed of 49 wires. In that case, the sensitivity of the transducer 10, when used with the rod member 38 will be seven times greater than if a solid steel rod member of the same total circumference had been used.

In operation, the transducer 10 may be used to output a voltage which is linearly related to the axial disposition of rod member 38 within tube 32. The probe assembly 30 is initially inserted into the hollow portion of coil 16 with the end 40 of rod member 38 disposed near or above the opening 36 of tube 32. Upon positioning a portion of tube 32 within coil 16, both the hollow tube 32 and the rod member 38 can be slidably displaced within the hollow interior of coil 16 axially independent of each other. The coil inductance, and hence the voltage output of the transducer, is proportional to that length of rod member 38 which protrudes out of hollow tube 32, provided that both of the protruding portion of rod member 38 and a portion of tube 32 are disposed within the hollow portion of coil 16.

As explained above, one advantage of the present invention is that the transducer may be used to output a change in voltage linearly related to the movement of two surfaces relative to each other. In particular, the transducer having a dual probe assembly may be useful under harsh environmental conditions. For example, the transducer may be used to measure the expansion of an object being heated in an oven. The rod member 38 may be attached to one surface of the object, and the tube 32 may be attached to an opposite surface, while the coil remains positioned outside of the oven. Hence, expansion of the object will displace the rod member and the tube with respect to each other, resulting in an output voltage which is related to the amount of expansion.

In the foregoing description, it will be readily appreciated by those skilled in the art that modifications may be made to the invention without departing from the concepts disclosed herein. Such modifications are to be considered as included in the following claims unless those claims, by their language, expressly state otherwise.

I claim:

1. A transducer for measuring linear displacement of an object, comprising:
a uniformly wound substantially cylindrical coil for generating a magnetic field when an electrical current passes therethrough, said coil having a predetermined length and an inductance determined in part by said length, said coil defining a hollow interior portion and having a longitudinal axis;
a probe assembly comprising a hollow aluminum tube disposed substantially within said hollow interior portion of said coil and having a first opening and a second opening, and further comprising a steel rod at least partially disposed within said hollow aluminum tube through said first opening, the position of each of said tube and said steel rod being manually adjustable with respect to each other and with respect to said coil in a direction co-axial with the longitudinal axis of said coil to cause a change in the inductance of said coil;
a protective shield surrounding a substantial portion of said probe assembly and said coil, said protective shield having a slit aligned with said longitudinal axis of said coil and extending the entire length thereof;
an oscillating circuit connected electrically in parallel to said coil, said oscillating circuit being responsive to said change in the inductance of said coil to output an oscillating signal having a voltage amplitude varying as a function of the change in the inductance; and
a demodulating circuit connected electrically in parallel to said oscillating circuit, said demodulating circuit being responsive to changes in said oscillating signal of said oscillating circuit to output a voltage signal which is linearly related to the axial position of said steel rod within said hollow aluminum tube.

2. The device of claim 1, wherein said shield is formed of steel.

3. The device of claim 1, wherein said steel rod comprises a plurality of wires, said wires being bound together so that said steel rod has the appearance of a unitary member.

4. The device of claim 3, wherein output voltage sensitivity to the axial displacement of said steel rod within said hollow aluminum tube increases with an increase in the number of wires used to construct said steel rod.

5. The device of claim 3, wherein said steel rod has a transverse cross-section defining a predetermined circumference, and wherein sensitivity is increased in accordance with the following equation:

$$S = \sqrt{n}$$

wherein S defines a gain in sensitivity for the probe assembly and n defines the number of wires employed to construct the steel rod having the predetermined circumference.

6. A transducer for measuring linear displacement of an object, comprising:
a uniformly wound substantially cylindrical coil for generating a magnetic field when an electrical current passes therethrough, said coil having a predetermined length and an inductance determined in part by said length, said coil defining a hollow interior portion and having a longitudinal axis;
a probe assembly comprising a hollow copper tube disposed substantially within said hollow interior portion of said coil and having a first opening and a second opening, and further comprising a steel rod at least partially disposed within said hollow copper tube through said first opening, the position of each of said tube and said steel rod being manually adjustable with respect to each other and with respect to said coil in a direction co-axial with the longitudinal axis of said coil to cause a change in the inductance of said coil;
a protective steel shield surrounding a substantial portion of said probe assembly and said coil, said protective steel shield having a slit aligned with said longitudinal axis of said coil and extending the entire length thereof;
an oscillating circuit connected electrically in parallel to said coil, said oscillating circuit being responsive to said change in the inductance of said coil to output an oscillating signal having a voltage amplitude varying as a function of the change in the inductance; and
a demodulating circuit connected electrically in parallel to said oscillating circuit, said demodulating circuit being responsive to changes in said oscillating signal of said oscillating circuit to output a voltage signal which is linearly related to the axial position of said steel rod within said hollow copper tube.

7. The device of claim 6, wherein said shield is formed of steel.

8. The device of claim 6, wherein said steel rod comprises a plurality of wires, said wires being bound together so that said steel rod has the appearance of a unitary member.

9. The device of claim 8, wherein output voltage sensitivity to the axial displacement of said steel rod within said hollow copper tube increases with an increase in the number of wires used to construct said steel rod.

10. The device of claim 8, wherein said steel rod has a transverse cross-section defining a predetermined circumference, and wherein sensitivity is increased in accordance with the following equation:

$$S = \sqrt{n}$$

wherein S defines a gain in sensitivity for the probe assembly and n defines the number of wires employed to construct the steel rod having the predetermined circumference.

* * * * *